United States Patent
Goshima et al.

(10) Patent No.: US 6,216,764 B1
(45) Date of Patent: Apr. 17, 2001

(54) METHOD AND APPARATUS FOR MAKING LEAD-ACID BATTERIES

(75) Inventors: Teruo Goshima; Kazuo Okada, both of Osaka (JP)

(73) Assignees: Yuasa Corporation; Yuasa Engineering, Ltd., both of Takatsuki (JP)

( * ) Notice: Subject to any disclaimer, the term of this patent is extended or adjusted under 35 U.S.C. 154(b) by 0 days.

(21) Appl. No.: 09/025,833

(22) Filed: Feb. 19, 1998

(30) Foreign Application Priority Data

Feb. 20, 1997 (JP) .................................... 9-035777

(51) Int. Cl.$^7$ ............................ B22D 25/04; H01M 2/28
(52) U.S. Cl. ..................... 164/108; 164/109; 164/126; 164/128; 29/623.1
(58) Field of Search .................... 164/108, 109, 164/126, 128, 333, 348; 29/623.1

(56) References Cited

U.S. PATENT DOCUMENTS

| | | | |
|---|---|---|---|
| 2,978,762 | 4/1961 | McAlpine | 164/109 |
| 3,072,984 | * 1/1963 | Bronstert | 164/109 |
| 3,087,005 | 4/1963 | Sabatino et al. | 164/102 |
| 3,912,544 | 10/1975 | Sabatino | 136/134 R |
| 4,144,927 | 3/1979 | Emerton et al. | 164/108 |
| 4,377,197 | 3/1983 | Oxenreider et al. | 164/112 |
| 4,425,959 | 1/1984 | Mund | 164/342 |
| 4,774,993 | 10/1988 | Kallup et al. | 164/323 |
| 5,170,835 | * 12/1992 | Eberle et al. | 164/108 |
| 5,505,744 | 4/1996 | Eberle et al. | 29/623.4 |

FOREIGN PATENT DOCUMENTS

| | | |
|---|---|---|
| 1120559 | 7/1968 | (GB) . |
| 1126818 | 9/1968 | (GB) . |
| 1136009 | 12/1968 | (GB) . |
| 2 023 471 | 1/1980 | (GB) . |
| 2 120 144 | 11/1983 | (GB) . |
| 2 120 143 | 11/1986 | (GB) . |
| 64-83368 | * 3/1989 | (JP) ..................................... 164/108 |
| 1-195662 | 8/1989 | (JP) . |
| 5-3028 | 1/1993 | (JP) . |
| 7-122259 | 5/1995 | (JP) . |
| 8-212999 | 8/1996 | (JP) . |

OTHER PUBLICATIONS

Abstract of Japanese Patent Publication 07–122259 Published May 12, 1995.

* cited by examiner

Primary Examiner—Harold Pyon
Assistant Examiner—I.-H. Lin
(74) Attorney, Agent, or Firm—McGinn & Gibb, PLLC

(57) ABSTRACT

A cast-on method and its apparatus for joining battery plates to a post in which heat capacity of a mold for forming a post and a strap is less than five times of heat capacity of metals to be introduced in the mold. The mold is made of materials having less linear thermal expansion coefficient preferably less than $18\times10-6/°$ K. The mold may be dipped into calmly flowing molten metal keeping a constant level.

2 Claims, 3 Drawing Sheets

METHOD AND APPARATUS FOR MAKING LEAD-ACID BATTERIES

BACKGROUND OF THE INVENTION

1. Field of the Invention

This invention relates to a method and an apparatus for making lead-acid batteries and, in particular, to an improved method and apparatus for forming joints of plate lugs and post straps of lead-acid storage batteries.

2. Description of the Related Art

The making of lead-acid storage batteries usually involves plate preparing process and assembling process. The latter process involves plate/separator stacking, joint forming necessary to build up cell groups, and group insertion into vessels or containers. The present invention relates to a method and an apparatus for mechanically and electrically joining positive and negative plates to respective positive and negative posts, to compose a group of positive plates, negative plates and separators. There are two methods in general to electrically and mechanically join plates with posts. A first method is a burn-together method that is applied to a plates of upright position. Lugs of positive and negative plates are inserted in respective strap-forming molds having comb-like slits, and positive and negative posts are put in position in each mold. Then, plate lugs and a bottom part of the post are melted by a torch using lead alloy solder to joint the lugs and post. A second method is so-called "cast-on-strap" method (COS) in which lugs of inverted plate groups are inserted into molten lead or lead alloy filled in a mold of a necessary shape of cavity, and after cooling, the group is removed from the mold. The latter method simultaneously provides posts when forming straps, and the process is easy to be automated. An early embodiment of the latter was described in U.S. Pat. No. 3,087,005, and many modifications and improvements have been publicized after the issue.

In the COS method, the surface of the lugs should be wetted with the molten lead to form a perfect joint between each other. This could only be attained by keeping the temperatures and relating conditions of lugs and molten lead in a mold within strictly narrow range even though various treatments are applied on the surfaces of lugs. To realize the satisfactory operating condition, various improvements were proposed on molds and relating apparatus. Japanese Patent Kokai H01-195662 proposes heat insulators between "cast-on" mold and molten lead supply channels. The supply channels have heaters in them and the mold equips a cooling device to control the temperature condition, and the mold is made to have a big heat capacity to minimize local temperature difference and the temperature of the molten lead must be kept sufficiently high. An example of the operating condition by using the similar apparatus is: Molten lead of 500° C. is introduced in the mold of 240° C. When the temperature of lead goes down to 380° C., the lugs of a group are quickly inserted into the molten lead and the cooling device is actuated. After the lead solidifies, the group is removed from the mold. In this operation, molten lead is significantly oxidized, and the timing of lug insertion is very narrow, while cooling of the mold having a big heat capacity takes time. The mold construction is also complicated and it takes much time in changeover.

To improve these drawbacks, Japanese patent Kokai H05-03028 proposes a manufacturing method including a process in which sprayed molds are dipped in a pot of molten lead to homogeneously heat them. The method affords a stable operation and is suitable for a production in quantity but it requires a relatively large energy consumption, and changeover is also not easy.

Japanese Patent Kokai H07-122259 discloses a simplified mold and shortened heating and cooling times. This mold, although simple, is still heavy in weight and large in size compared with those of straps formed by it, and this mold is not suitable for an automated facility. Japanese Patent Kokai H08-212999 discloses a COS method in which mold thickness is thinner at around a part, or the whole of its cavity than that of straps to be formed, and a heating and cooling system including the utilization of Joule's heat by an electric current across the mold. In this case, the mold must have a thicker part in which Joule's heat does not much generate, and distortion of a whole mold is serious because of the heat cycle to the mold of a part of a mold of extremely different thickness. Also, this method is hard to apply to simultaneously form big post when lugs are welded together as a strap.

SUMMARY OF THE INVENTION

The object of this invention is to solve the above-mentioned drawbacks of the conventional methods and apparatus. We propose a use of molds of a simple construction and low temperature molten lead, which results in wide tolerance of operation time, high productivity, easy changeover of molds, long mold life, and the products thereby have a high reliability.

To attain the object, we propose the following method and apparatus for a cast-on method which contains;

- at least one mold for forming a post, and a strap which connects the post with at least one plate;
- means for introducing molten metal of lead or lead alloy in the mold;
- means for inserting a lug of the above-mentioned plate into the molten metal before the metal does not coagulate;
- means for cooling the above-mentioned mold and means for separating the connected body of the post, the strap and the plate from the mold by moving the connected body and/or the mold apart;
- wherein the heat capacity of said mold does not exceed five times of the heat capacity of said alloy in the mold.

The features and aspects of our invention will become more apparent upon reading the following detailed description in conjunction with the accompanying drawings.

DETAILED DESCRIPTION OF THE PREFERRED EMBODIMANTS

Figure 1:
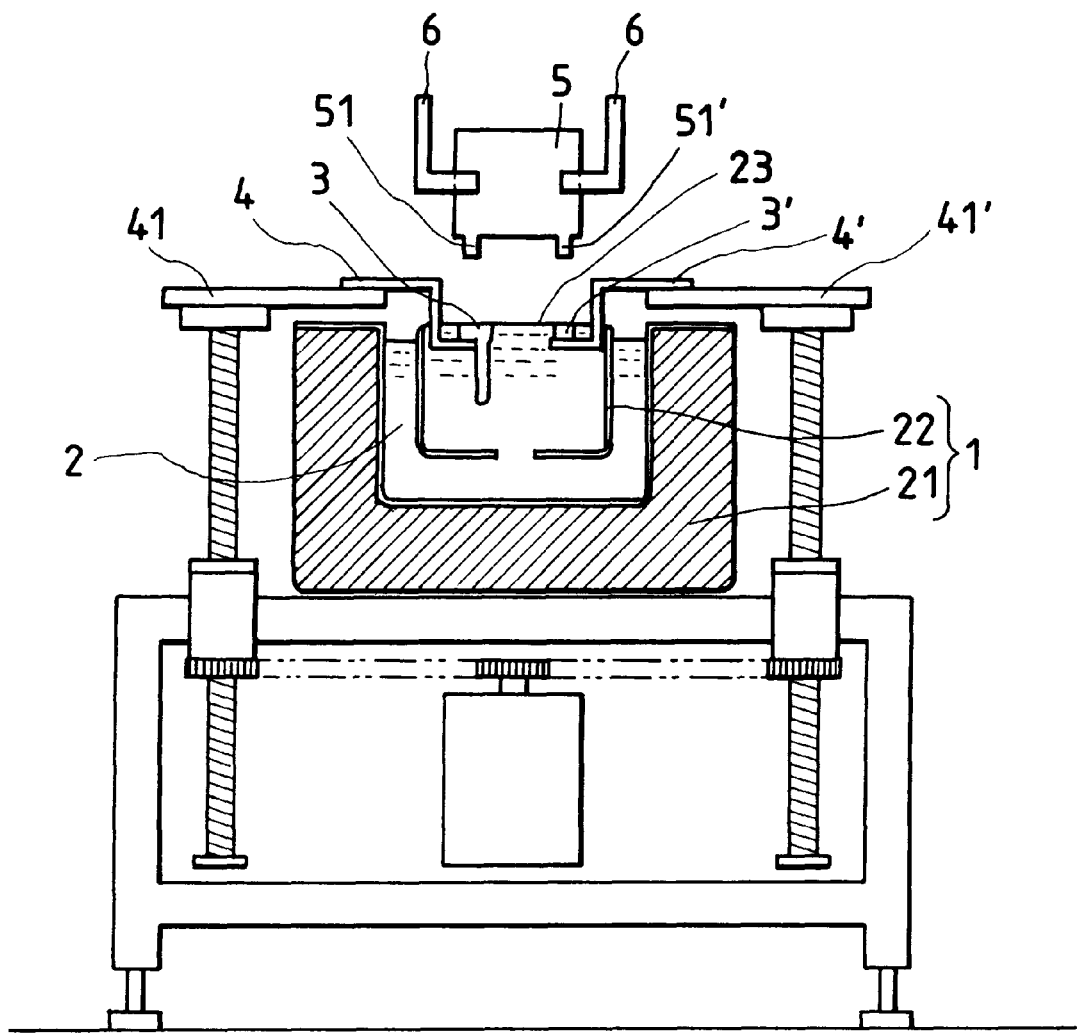
FIG. 1 is a partially cutaway side view of an embodiment showing a step of forming a joint between posts and a group.

Referring to the attached drawings, 1 is a melting device which includes a melting pot 21 and a constant leveler 22 (heating and other devices are not illustrated here). 2 is molten lead or lead alloy (hereafter called molten alloy), which is calmly flowing into the constant leveler from below the leveler by a pumping device (not shown here) and overflow from a part or the whole of top periphery of the leveler 22, and keep a molten lead level 23 constant and clean enough needed to the operation described below. 3 and 3' are molds for positive and negative posts and straps. Material which forms the mold is selected from that having small thermal expansion coefficient considering mechanical strength, heating and cooling cycles, resistivity to molten lead and resistivity to flux in high temperature conditions such as 400 degrees centigrade. In this invention, as operating temperature does not much exceed 400 degrees centigrade, molds having thin wall thickness can be used for a considerably long period of time. The linear thermal expansion coefficient of the material for the mold 3 and 3' should be small, preferably less than $18 \times 10-6/°$ K. A smooth machining of inner surface of the mold and a necessary draft of, for example, one to two degrees result in an easy separation of solidified alloy from the mold. But a small amount of mold releasers is successfully applicable. The separation is more easy by applying vibrations or light shocks to the molds.

As a material of the mold 3 and 3', metals and ceramics are usable. Ceramics have small thermal expansion coefficient and easy to be separated from the cast alloys, but metals are easy to be applicable due to high strength to rupture, high heat conductivity, and mainly due to easy machinability. Atomic heat of a solid metal is practically 26 Joule/oK from the law of Dulong-Petit, and a molar heat of an alloy is estimated by a sum of molar heats of constituent elements from the law of Neumann-Kopf. Accordingly, heat capacities of lead alloy to be used as a post-strap and a mold for forming it can be calculated from atomic weights of elements and designed weights of the post-strap and the mold when a weight ratio of major elements which constitutes both the post-strap and the mold. Various kinds and grades of ferrous metals including iron, steel and stainless steel, or titanium and its alloys are successfully applied to this invention.

Molds 3 and 3' can be manufactured by engraving a metal block or thick plate, or by processing shin plate or pipe of the above-mentioned materials. Each mold should be designed to produce an exact shape and dimensions of a positive or negative post and a strap which connects plate lug(s) of a battery cell in a upside-down position. This invention does not specify the thickness of the mold, but heat capacity of the mold should be less than five times of that of lead alloy introduced in the mold. To realize the scope, a thicker limit of wall thickness of an embodiment is practically around five millimeters, and a lower is around one millimeter considering of mechanical strength. Inner surface of the mold should be smooth and have a necessary draft. In the case of a terminal post of tall, tapered column used in an end-cell, bent, welded plate or squeezed pipe may be used. For this purpose, however, electric discharge machining is suitable for attaining a precision processing.

In this invention, the term "mold" refers to as a part of a receptacle that contains molten alloy 2 in it and contacts to the alloy 2. Reinforcing and/or sustaining members or mold holders are not included in the definition of the mold.

In the operation of the above described apparatus, molten alloy 2 is supplied to a mold through a pipe or a open conduit by gravity or pumping from melting pot 21, or by dipping up the alloy using a small ladle. The preferable method of introducing molten alloy 2 into molds 3 and 3' is to dip the whole molds into flowing molten alloy 2 contained in a pot and elevate the molds. In one embodiment of the present invention shown in FIGS. 1 through 4, molds 3 and 3' are firmly connected to mold holders 4 and 4', which are connected to shifting devices 41 and 41' respectively. Said shifting devices lowers the molds 3 and 3' to dip them into molten alloy of constant leveler 22 in the melting device 1, and raise them with molten alloy in them. The embodiment eliminates heating devices for molten-alloy-supplying channel or path, thus decreases oxidation of molten alloy while in alloy transportation. At the same time the embodiment also facilitates to lower the temperature of molten alloy 2 in operation as temperatures of said thin-wall molds 3, 3' quickly approaches that of molten alloy 2, and temperatures of molten alloy in the molds 3, 3' do not much go down after the molds are taken out in the air, thus decreasing formation of alloy oxide slag, and moreover, allowable time-span of optimum temperature range to insert plate lugs 51 and 51' is widened, which means stable operation is easily attained. The flow of molten alloy accelerates heating of molds in molten alloy 2, and excludes alloy slag, if it is produced in a small amount, to make the alloy surface fresh and to help supplying fresh alloy to the molds 3, 3', which result in short operation cycle, saved alloy consumption, excellent welding and decreased maintenance.

In general, molten metal flows by convection or electromagnetic force. The preferable device is a mechanical pump to furnish constant level 22 in melting device 1 to make a calm flow without producing much slag. Irregular flow of molten alloy is observed in the case of the conventional method in which thick, large mold is dipped in the molten alloy, but the method increases slag formation and does not remove slag on the surface, and disturbs temperature condition by its large heat capacity.

Figure 3:
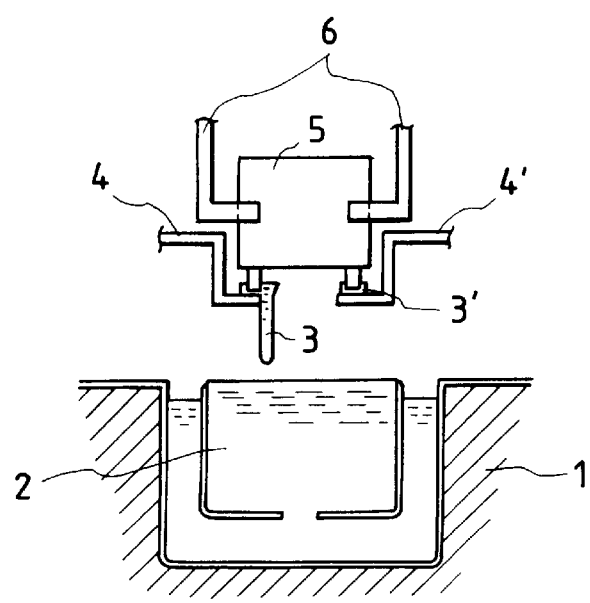
FIG. 3 is a partially cutaway side view showing plate lugs immersed in the molds of an embodiment.

Now in FIG. 1, there is shown a battery cell group 5, lugs of which, 51 and 51', are to be connected by an embodiment of this invention. The group 5 is held in an upside down position by a set of group holders 6 above the mold 3 and 3' in strictly set alignment. The molds 3 and 3' are filled with specified composition of molten alloy, and then elevated by shifting devices 41 and 41'. The group 5 may go down to an appropriate height. As shown in FIG. 3, lugs 51 and 51' are inserted into the molten alloy in the molds 3 and 3'. The height of alloy surface in the molds 3 and 3' may rise as the inserted volume of the lugs 51 and 51'. A good wetting on the lug surface may form a meniscus to pull up molten alloy and prevent the alloy from overflowing. But when volumes of lugs 51 and 51' to be inserted are big, the alloy surface should be lowered. This can be attained, for example, by inclining the molds from perpendicular when in dipping up. Upper edges of the molds 3 and 3' can be tapered to avoid a trap of extra alloy on the edges. This helps minimize spillage of alloy pellets around the device. Cleaning or grinding or applying flux, or tin or solder plating on surface of lugs 51, 51' to be joined is known technologies and is successfully applied.

Figure 4:
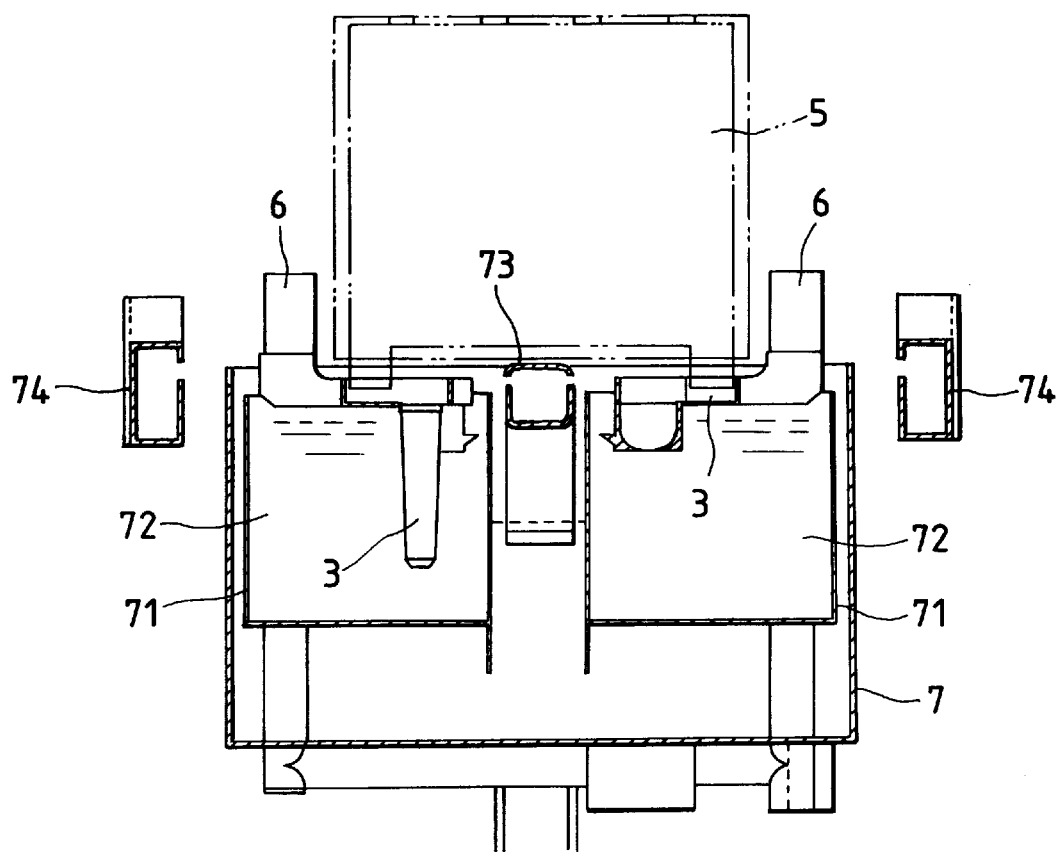
FIG. 4 is a cutaway side view of molds and water-cooling device where the molds are in a water bath.

After the insertion of lugs 51 and 51', molds 3 and 3' should be kept standstill before the molten alloy coagulates. Cooling the molds is necessary and is done by blowing cold air or spraying water. One recommended example is to immerse a part or a major part of molds in a water-bath. This quickens the operation and improves the quality of the cast parts. In FIG. 4, an outer shield of cooling device 7 contains water bath 71 having cooling water 72 in it. 73 is a blow-pipe of air, and 74 and 75 are exhaust ducts.

The cooling device 7 waiting in the side of melting device 1 traverses to right below the molds 3 and 3' with retroceding the melting device 1, and lift to water-cool the molds 3 and 3'. Evolving damp is expelled by dry air blown from the blow-pipe 73 and sucked in the exhaust ducts 74 and 75. The water cooling makes the cast posts and straps of fine crystal structure. When using water, the melting device and watering device should be isolated from each other, or otherwise completely covered in order to keep safety. In this invention these actions are easy to be taken as the devices are compact in size and light in weight.

Figure 5:
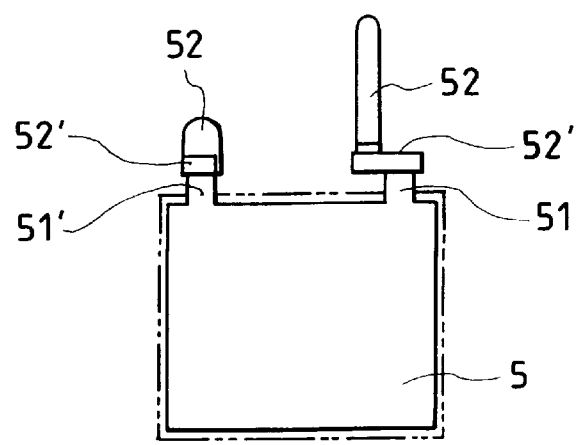
FIG. 5 is a side view of a finished storage battery cell group made by an embodiment of this invention.

After the molten alloy in the molds solidifies, group 5 and molds 3 and 3' are separated by being drawn to the opposite direction each other by shifting device 41 and 41', which also serves as means to separate castings that connects plates and cast posts from the molds. FIG. 5 shows thus formed battery cell group 5 with its posts 52 and connecting straps 52' integrally welded on lugs 51 and 51'. To facilitate separation, vibrations or light shocks or both are successfully applied to the molds before and during the separation process.

The following examples are included to aid in the understanding of the invention, and variations may be made by one skilled in the art without departing from the spirit and scope of the invention.

Referring to FIG. 1, molds 3 and 3', the details of which are explained later, are dipped into molten alloy in the constant leveler 2 about two seconds, and are then elevated upward until the plate-lugs 51 and 51' of the group 5, in position above the molds, are immersed in the half-depth of molten alloy in the mold cavities. The molds are kept standing about six seconds. During the time, a water bath 71 is traversed and raised to water-cool the molds 3 and 3' for about three seconds. After the water bath 71 is retroceded, the molds 3 and 3' are descended by shifting devices 41 and 41' to separate them from the group 5.

In the above-mentioned process, molds made of a kind of stainless steel and having different heat capacities are tested to manufacture cell groups. After the manufacture, the cast posts 52, and connecting straps 52' with connected lugs 51, 51' are cut to inspect the section of post and straps, and welded interface between lugs 51, 51' and strap 52'. The results are shown in Table 1. In the table, heat capacity of the mold is expressed as multiplication of that of molten alloy in the mold.

TABLE 1

| Run No. | Heat capacity of mold (multiplication) | Section of posts and straps | Welded junction between strap and lugs | Separation of molds from cast parts |
|---|---|---|---|---|
| 1 | 1.3 | good | good | easy |
| 2 | 2.1 | good | good | easy |
| 3 | 3.0 | good | good | easy |
| 4 | 5.1 | good | good | easy |
| 5 | 6.8 | cracks observed | some welding not good | sometimes not easy |
| 6 | 8.6 | cracks observed | welding not good | sometimes not easy |

When heat capacity of the mold is much more than five times of that of alloy. as shown in the Table 1, cast post and connecting strap or junction between strap and lugs tend to have faults. This is firstly due to lowered temperature of molten alloy introduced in the mold, and secondly, due to prolonged time to coagulation of alloy in the mold. To overcome the trouble, prolonged dipping time in molten alloy, higher temperature of molten alloy or prolonged cooling time of the mold may be possible countermeasures. But such a change of process parameters apparently lowers productivity, and at the same time causes more oxidation of molten alloy, and also causes inferior quality of joints due to overheating of lugs.

In a conventional "cast-on-strap" process, its mold has a heat capacity of several ten to hundred times of that of molten alloy introduced in it, and has a complicated construction with heaters and electric circuits and cooling pipes. Repeated rapid heating and cooling of such a thick and heavy mold results in a distortion of the mold caused by thermal stress. Moreover, times necessary for one cycle are 40 to 60 seconds or more, that means a low productivity, and is also inferior in economy of heat. Unlike the above-mentioned process, this invention has the following advantages:

The molds are light in weight and simple in construction, which lead to saved mold material, simplified mechanisms, inexpensive initial and maintenance costs, and at the same time, much less man-hours in changeover.

The lowered molten alloy temperature as compared with conventional can lead to less oxide slag formation, longer apparatus life and less energy consumption. Moderate temperature drop in plate-lug insertion process makes it possible to widen the time-span of the optimum condition to insert lugs for secure joint, thus brings about a stable operation.

Inclusion of oxide slag in the post-strap is eliminated, which makes joints of excellent quality.

Cooling after lug insertion is easy because of low heat capacity.

Mold walls do not have much difference in thickness, which eliminates strains due to thermal stresses.

Heating and cooling of the mold is attained quickly, which helps high productivity.

Mold cooling by water makes excellent quality of posts and straps.

Figure 2:
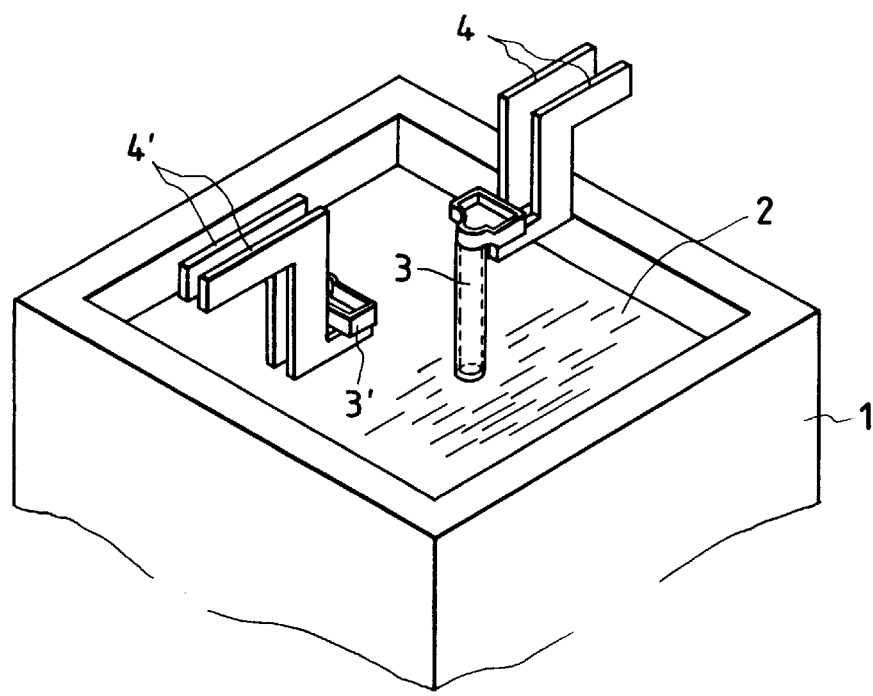
FIG. 2 is a perspective view of molds above molten alloy in a process of the invention.

This invention is applied to the manufacturing process of all kinds of lead-acid batteries using lead alloys including pure lead, lead-antimony, lead-tin, lead-calcium, lead-tin-calcium, and other binary, ternary, quaternary or multi-ingredient lead alloys or lead alloys having any additive(s). In FIG. 1 through 3 molds are shown only one pair for easier comprehension, but when the inventions applied to six-cell battery production, six pairs of molds are arranged in position to accommodate the production. Variations may be made by one skilled in the art without departing from the spirit and scope of the invention.

We claim:

1. A method of forming a battery, the method comprising:

selecting a molten metal of lead or lead alloy having a heat capacity;

using a mold that has a heat capacity less than or equal to 5.1 times the heat capacity of the molten metal of lead or lead alloy to be introduced into the mold;

introducing the molten metal into the mold, wherein the molten metal contained in a space flows at a constant level, and the space is at least partially surrounded by a top periphery of a constant leveler which is included in a melting device;

inserting a lug of the battery into the molten metal of the mold;

cooling the mold to form a connected body of the metal and the lug; and separating the connected body from the mold.

2. The method of claim 1, wherein when introducing the molten metal, the mold is dipped into the molten metal.

\* \* \* \* \*